United States Patent [19]

Konno et al.

[11] Patent Number: 5,481,421
[45] Date of Patent: Jan. 2, 1996

[54] MAGNETIC DISK DRIVER CAPABLE OF DECREASING INGRESS OF NOISE IN A MAIN SURFACE OF A MAIN FRAME

[75] Inventors: Makoto Konno; Hisateru Komatsu; Takashi Watanabe, all of Tendou, Japan

[73] Assignee: Mitsumi Electric Co., Ltd., Tokyo, Japan

[21] Appl. No.: 313,332

[22] Filed: Sep. 27, 1994

[30] Foreign Application Priority Data

Feb. 8, 1994 [JP] Japan ................... 69-014353

[51] Int. Cl.[6] ................................... G11B 5/55
[52] U.S. Cl. ........................................ 360/106
[58] Field of Search ....................... 360/104, 106

[56] References Cited

U.S. PATENT DOCUMENTS

| Re. 32,781 | 11/1988 | Takahashi | 360/99.05 |
| 4,750,068 | 6/1988 | Akasaki | 360/106 |
| 5,212,417 | 5/1993 | Nagai | 360/106 |

FOREIGN PATENT DOCUMENTS 60-163275  8/1985  Japan .................. 360/106

Primary Examiner—A. J. Heinz
Attorney, Agent, or Firm—Frishauf, Holtz, Goodman, Langer & Chick

[57] ABSTRACT

In a magnetic disk driver for driving a magnetic disk inserted thereinto, a pair of locating members locates both ends of a guide bar to mount the guide bar on a main surface of a main frame in cooperation with a guide bar cramp. Disposed in the vicinity of a magnetic head, one of the locating members includes a projecting portion which projects on the main surface of the main frame. The projecting portion may be a projection squeezed out of the main frame by half blanking. Disposed over the main surface of the main frame and apart from the main frame, a head carriage holds a magnetic head movably along a predetermined radial direction to the magnetic disk. The head carriage comprises a head carriage body and a supporting frame for supporting the head carriage body. The supporting frame projects into the main surface of the main frame and is fitted on the guide bar. The main frame comprises a safe portion, which is opposed to the guide bar, for preventing contact of the supporting frame of the head carriage with the main surface of the main frame when the head carriage slides along the guide bar. The safe portion includes a concave portion. The concave portion may be dented by half blanking.

3 Claims, 4 Drawing Sheets

MAGNETIC DISK DRIVER CAPABLE OF DECREASING INGRESS OF NOISE IN A MAIN SURFACE OF A MAIN FRAME

BACKGROUND OF THE INVENTION

This invention relates to a magnetic disk driver for driving a magnetic disk inserted thereinto and, more particularly, to a frame structure around a head carriage in the magnetic disk driver.

As well known in the art, a magnetic disk driver of the type described comprises a main frame wherein the magnetic disk is mounted thereover. The main frame has a main surface and a side wall. A magnetic head reads/writes data from/to the magnetic disk. Disposed over the main surface of the main frame and apart from the main frame, a head carriage holds the magnetic head movably along a predetermined radial direction to the magnetic disk. The head carriage comprises a head carriage body and a supporting frame for supporting the head carriage body. Fixed on the side wall of the main frame, a driving arrangement has a driving shaft extending in parallel with the predetermined radial direction. The driving arrangement moves the head carriage along the predetermined radial direction.

A guide bar is opposed to the driving shaft with the head carriage inserted between the guide bar and the driving shaft. The guide bar extends in parallel with the predetermined radial direction and has both ends mounted on the main surface of the main frame. The guide bar guides the head carriage in the predetermined radial direction by sliding the supporting frame of the head carriage that is fitted on the guide bar. Fixed on the main surface of the main frame, a guide bar clamp clamps the guide bar on the surface of the main frame. A pair of locating members locates both ends of the guide bar to fix the guide bar on the main surface of the main frame in cooperation with the guide bar clamp. One of the locating members is disposed in the vicinity of the magnetic head. The main frame comprises a safe portion opposed to the guide bar. The safe portion prevents contact of the supporting frame of the head carriage with the main surface of the main frame when the head carriage slides along the guide bar.

In the prior art, the pair of the locating members consists of a pair of bent pieces which are formed by cutting and bending parts of the main frame. As a result, cut bores corresponding to the bent pieces are bored in the main frame. In addition, as the safe portion is used a frame bore bored in the main frame. With this structure, noises invade through the cut bores and the frame bores. Furthermore, dirt and dust invade through the frame bore.

SUMMARY OF THE INVENTION

It is therefore an object of this invention to provide a magnetic disk driver which can decrease ingress of noises in a main surface of a main frame.

It is another object of this invention to provide a magnetic disk driver of the type described, which can decrease ingress of dirt and dust in the main surface of the main frame.

Other objects of this invention will become clear as the description proceeds.

On describing the gist of this invention, it is possible to be understood that a magnetic disk driver drives a magnetic disk inserted thereinto. The magnetic disk driver comprises a main frame wherein the magnetic disk is mounted thereover. The magnetic disk has a main surface and a side wall. A magnetic head reads/writes data from/to the magnetic disk. Disposed over the main surface of the main frame and apart from the main frame, a head carriage holds the magnetic head movably along a predetermined radial direction to the magnetic disk. The head carriage comprises a head carriage body and a supporting frame for supporting the head carriage body. Fixed on the side wall of the main frame, driving means has a driving shaft extending in parallel with the predetermined radial direction. The driving means moves the head carriage along the predetermined radial direction. A guide bar is opposed to the driving shaft with the head carriage inserted between the guide bar and the driving shaft. The guide bar extends in parallel with the predetermined radial direction and has both ends mounted on the main surface of the main frame. The guide bar guides the head carriage along the predetermined radial direction by sliding the supporting frame of the head carriage. Fixed on the main surface of the main frame, a guide bar clamp clamps the guide bar on the main surface of the main frame. A pair of locating members locates both ends of the guide bar to fix the guide bar on the main surface of the main frame in cooperation with the guide bar clamp.

According to an aspect of this invention, one of the locating members is disposed in the vicinity of the magnetic head and consists of a projecting portion which projects on the main surface of the main frame. Preferably, the projecting portion may be a projection squeezed out of the main frame by half blanking.

According to another aspect of this invention, the supporting frame of the head carriage projects into the main surface of the main frame and is fitted on the guide bar. The main frame comprises a safe portion, which is opposed to the guide bar, for preventing contact of the supporting frame of the head carriage with the main surface of the main frame when the head carriage slides along the guide bar. The safe portion consists of a concave portion. Desirably, the concave portion may be dented by half blanking.

DESCRIPTION OF THE PREFERRED EMBODIMENTS

Figure 1:
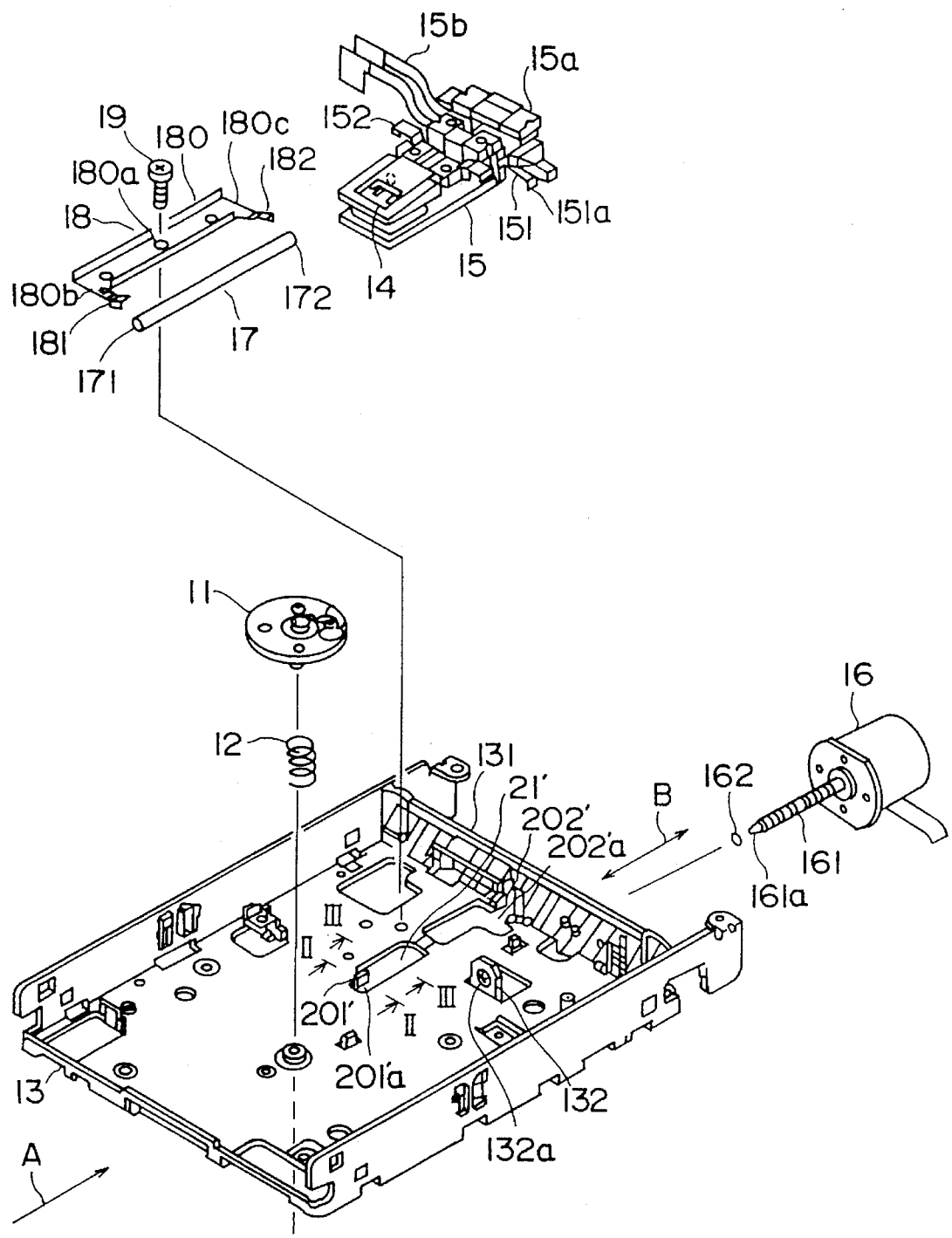
FIG. 1 is an exploded perspective view of a conventional magnetic disk driver.
Figure 2:
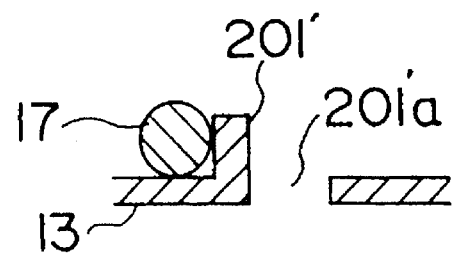
FIG. 2 is a sectional view taken along a line II—II of FIG. 1.
Figure 3:
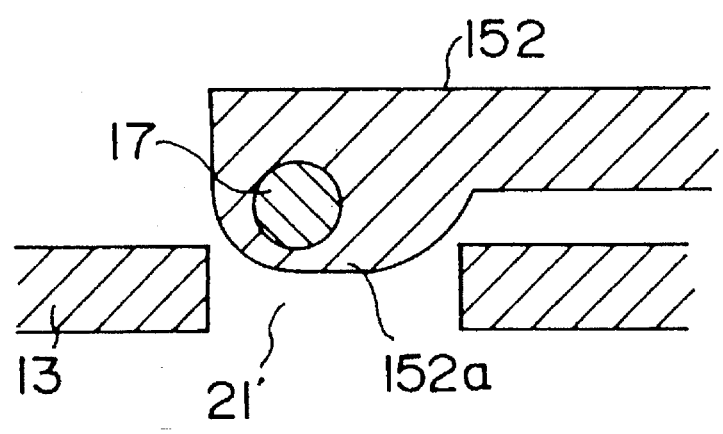
FIG. 3 is a sectional view taken along a line III—III of FIG. 1.

Referring to FIGS. 1 to 3, a conventional magnetic disk driver will be described at first in order to facilitate an understanding of the present invention. The magnetic disk driver is a device for driving a magnetic disk (not shown) such as a flexible disk. The magnetic disk has a disk center axis.

The magnetic disk is inserted in the magnetic disk driver from a direction indicated by an arrow A in FIG. 1. The inserted magnetic disk is held on a disk table assembly 11 having an assembly center axis. In this event, the assembly center axis coincides with the disk center axis. The disk table assembly 11 is rotatably supported via a spring 12 on a main surface of a main frame 13. That is, the magnetic disk is mounted over the main surface of the main frame 13. The disk table assembly 11 is rotatably driven by a motor (not shown), which is mounted on a back surface of the main frame 11, thereby the magnetic disk rotates. In addition, on the back surface of the main frame 13 is attached a substrate (not shown) on which a number of electronic parts (not shown) are mounted.

The magnetic disk driver comprises a magnetic head 14 for reading/writing data from/to the magnetic disk. The magnetic head 14 is held in a head carriage 15. A combination of the magnetic head 14 and the head carriage 15 is called a carriage assembly. The head carriage 15 is disposed over the main surface of the main frame 13 and is apart from the main frame in the manner which will later be described. The head carriage 15 holds the magnetic head 14 movably along a predetermined radial direction (i.e. a direction indicated by an arrow B in FIG. 1) to the magnetic disk.

In addition, the main frame 13 has a side wall 131 on which a stepping motor 16 is fixed. The stepping motor 16 drives the head carriage 15 along the predetermined radial direction B. More specifically, the stepping motor 16 has an axis of rotation (a driving shaft) 161 which extends in parallel with the predetermined radial direction B and which is threaded to form a male screw. The driving shaft 161 has a tip 161a which penetrates a hole 132a bored in a bent piece 132 and which provides with a steel ball 162. The bent piece 132 is raised from the main surface of the main frame 13 by cutting and bending. By the hole 132a and the steel ball 162, a position of the driving shaft 161 is defined so as to extend in parallel with the predetermined radial direction B and the tip 161a is rotatably held. The head carriage 15 comprises a head carriage body 15a and an arm 151 which extends from the head carriage body 15a to the driving shaft 161. The arm 151 has a leading edge which is bent so as to engage with the root in the male screw of the driving shaft 161, thereby forming a hook portion 151a. Therefore, when the driving shaft 161 of the stepping motor 16 rotates, the hook portion 151a of the arm 151 moves along the root in the male screw of the driving shaft 161, thereby moving the head carriage 15 along the predetermined radial direction B. At any rate, the stepping motor 16 serves as a driving arrangement for moving the head carriage 16 along the predetermined radial direction B.

Inasmuch as the driving shaft 161 of the stepping motor 16 is disposed at one side of the head carriage 15, the one side of the head carriage 15 is movably supported by the driving shaft 161 and is apart from the main surface of the main frame 13. However, because support occurs by the driving shaft 161, it is difficult to dispose the whole of the head carriage 15 apart from the main surface of the main frame 13. For this purpose, it is necessary to support and guide the head carriage 15 at another side thereof. To guide the head carriage 15 is a guide bar 17. That is, the guide bar 17 is opposed to the driving shaft 161 of the stepping motor 16 with the head carriage 15 inserted between the guide bar 17 and the driving shaft 161. The guide bar 17 extends in parallel with the predetermined radial direction B and has one end 171 and another end 172 which are mounted on the main surface of the main frame 13 in the manner which will later be described. The guide bar 17 guides the head carriage 15 along the predetermined radial direction B. As a result, the whole of the head carriage 15 is disposed apart from the main surface of the main frame 13. In addition, lead lines 15b extend from the carriage 15 to the vicinity of the guide bar 17 and the lead lines 15b are electrically connected to the substrate attached to the back surface of the main frame 13.

The guide bar 17 is clamped on the main surface of the main frame 13 by a guide bar clamp 18. The guide bar clamp 18 is fixed on the main surface of the main frame 13 by a binding small screw 19. More specifically, the guide bar clamp 18 comprises a rectangular fixed member 180 having a length longer than that of the guide bar 17 by a short distance. In about the center of the rectangular fixed member 180, a hole 180a is drilled through which a screw shaft of the binding small screw 19 passes. The rectangular fixed member 180 has one end 180b and another end 180c from which a pair of arms 181 and 182 extend to clamp the one end 171 and the other end 172 of the guide bar 17 with the guide bar 17 sandwiched between the arms 181 and 182, respectively. Inasmuch as the guide bar clamp 18 merely clamps the guide bar 17, the guide bar 17 is not mounted on the main surface of the main frame 13 by the guide bar clamp 18 alone. For this purpose, a pair of locating members for locating the both ends 171 and 172 of the guide bar 17 is needed.

In the prior art, as the pair of the locating members, a pair of bent pieces 201' and 202' is used which are formed by cutting and bending parts of the main frame 13. As a result, cut bores 201'a and 202'a corresponding to the bent pieces 201' and 202' are bored in the main frame 13 as shown in FIG. 2. At any rate, the pair of bent pieces 201' and 202' locates both ends 171 and 172 of the guide bar 17 to mount the guide bar 17 on the main surface of the main frame 13 in cooperation with the guide bar clamp 18.

The head carriage 15 comprises a supporting frame 152 for supporting the head carriage body 15a slidably along the guide bar 17. As shown in FIG. 3, the supporting frame 152 has a projecting portion 152a which projects into the main surface of the main frame 13. The projecting portion 152a is fitted to the guide bar 17. Under the circumstances, when the head carriage 15 slides along the guide bar 17, the projecting portion 152a of the supporting frame 152 is in contact with the main surface of the main frame 13. To prevent contact of the projecting portion 152a with the main surface of the main frame 13, a safe portion is formed in the main frame at a position opposite to the guide bar 13. In the prior art, as the safe portion, a frame bore 21' bored in the main frame 13 is used as shown in FIG. 3.

As described above, in the conventional disk driver, as the locating members for the guide bar 17, there are used the bent pieces 201' and 202' where the cut bores 201'a and 202'a are bored in the main frame 13. In addition, as the safe portion, there is used the frame bore 21' bored in the frame 13. If such bores are bored in the frame 13, noises invade through the bores. In particular, inasmuch as the end 171 of the guide bar 17 is close to of the magnetic head 14, the noises invading through the cut bore 201'a are in danger of affecting the magnetic head 14. If the worst happens, errors occur to reading/writing data from/to the magnetic disk. In addition, inasmuch as the lead lines 15b are disposed in the vicinity of the guide bar 17, the noises invading through the frame bore 21' are in danger of affecting the lead lines 15b as well as the magnetic head 14. Furthermore, inasmuch as the frame bore 21' is a relatively large bore, dirt and dust invade through the frame bore 21'.

Figure 4:
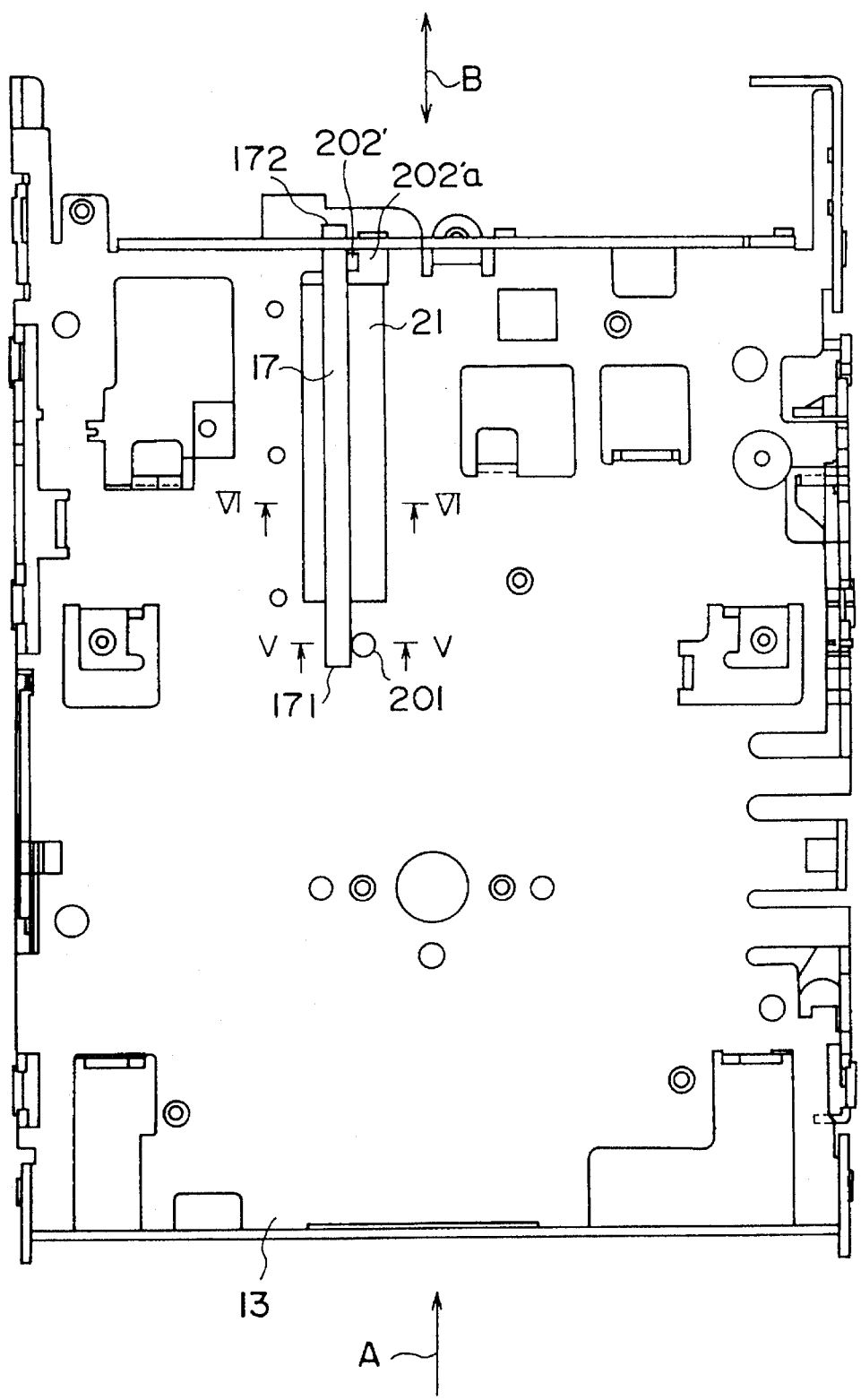
FIG. 4 is a plan view of a main frame and a guide bar in a magnetic disk driver according to an embodiment of this invention.
Figure 5:
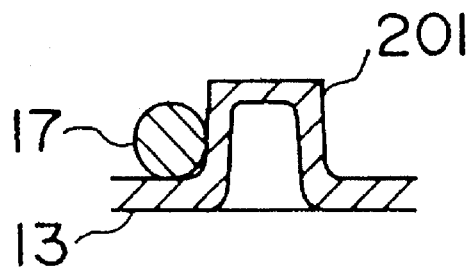
FIG. 5 is a sectional view taken along a line V—V of FIG. 4.
Figure 6:
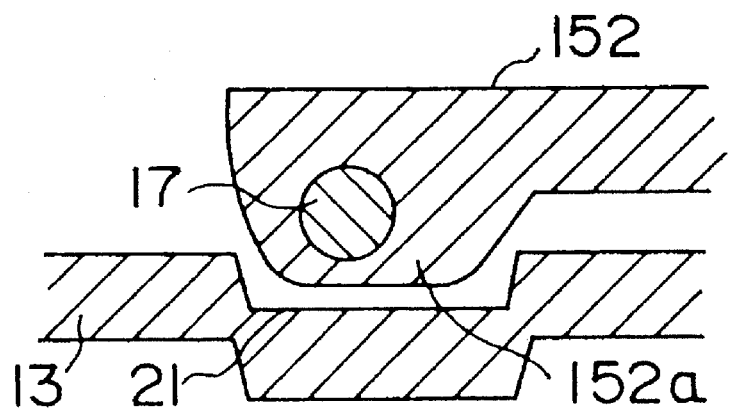
FIG. 6 is a sectional view taken along a line VI—VI of FIG. 4.

Referring to FIGS. 4 to 6, a magnetic disk driver according to an embodiment of this invention is similar in structure to that illustrated in FIGS. 1 to 3 except that the pair of locating members and the safe portion are different in structure from those illustrated in FIGS. 1 to 3.

Referring to FIG. 5 in addition to FIG. 4, one locating member disposed in the vicinity of the magnetic head 14 consists of a projecting portion 201 which projects on the main surface of the main frame 13. In the example being illustrated, the projecting portion 201 is a projection squeezed out of the main frame 13 by half blanking.

Referring to FIG. 6 in addition to FIG. 4, the illustrated safe portion consists of a concave portion 21. In the example being illustrated, the concave portion 21 is dented by half blanking.

As described above, inasmuch as the projecting portion 201 without forming the cut bore 201'a as the prior art, is used as the locating member disposed in the vicinity of the magnetic head, it is possible in this portion to prevent the ingress of noises. As a result, it is possible to reduce reading/writing errors for data from/to the magnetic disk. In addition, inasmuch as the concave portion 21 is used as the safe portion in place of the frame bore 21' as prior art, it is possible in this portion to prevent the ingress of dirt and dust as well as noise. It is therefore possible to provide the magnetic disk driver having high reliability.

While this invention has thus far been described in conjunction with a preferred embodiment thereof, it is to be understood that modifications will be apparent to those skilled in the art without departing from the spirit of the invention. For example, the projection portion 201 and the concave portion 21 may be formed by various manners other than half blanking.

What is claimed is:

1. A magnetic disk driver for driving a magnetic disk inserted thereinto, comprising:

a main frame, having a main surface and a side wall, wherein said magnetic disk is mounted over said main frame;

a magnetic head for reading/writing data from/to said magnetic disk;

a head carriage, disposed over the main surface of said main frame and being apart from said main frame, for holding said magnetic head movably along a predetermined radial direction to said magnetic disk, said head carriage comprising a head carriage body and a supporting frame for supporting said head carriage body;

driving means, fixed on the side wall of said main frame and having a driving shaft extending in parallel with the predetermined radial direction, for moving said head carriage along the predetermined radial direction;

a guide bar having two ends, said guide bar being opposed to the driving shaft with said head carriage inserted between said guide bar and the driving shaft, said guide bar extending in parallel with the predetermined radial direction, and said guide bar having both ends thereof mounted on the main surface of said main frame, for guiding said head carriage along the predetermined radial direction by sliding the supporting frame of said head carriage;

a guide bar clamp, fixed on the main surface of said main frame, for clamping said guide bar on the main surface of said main frame; and a pair of locating members for locating said both ends of said guide bar to mount said guide bar on the main surface of said main frame in cooperation with said guide bar clamp, one of said locating members being disposed close to said magnetic disk and including a projecting portion which projects on the main surface of said main frame, the protecting portion being a protection squeezed out of said main frame by half blanking so as to form an inverted U-shaped projection which forms a continuous, uninterrupted surface with the surface of the frame, thereby creating a frame without any openings therein around the area of the projection so as to prevent dirt and noise from passing into the disk driver via the frame.

2. A magnetic disk driver for driving a magnetic disk inserted thereinto, comprising:

a main frame, having a main surface and a side wall, wherein said magnetic disk is mounted over said main frame;

a magnetic head for reading/writing data from/to said magnetic disk;

a head carriage, disposed over the main surface of said main frame and being apart from said main frame, for holding said magnetic head movably along a predetermined radial direction to said magnetic disk, said head carriage comprising a head carriage body and a supporting frame for supporting said head carriage body, the supporting frame projecting into the main surface of said main frame;

driving means, fixed on the side wall of said main frame and having a driving shaft extending in parallel with the predetermined radial direction, for moving said head carriage along the predetermined radial direction;

a guide bar having two ends, said guide bar being opposed to the driving shaft with said head carriage inserted between said guide bar and the driving shaft, said guide bar extending in parallel with the predetermined radial direction, and said guide bar having both ends thereof mounted on the main surface of said main frame, for guiding said head carriage along the predetermined radial direction by sliding the supporting frame of said head carriage that is fitted on said guide bar;

a guide bar clamp, fixed on the main surface of said main frame, for clamping said guide bar on the main surface of said main frame; and a pair of locating members for locating said both ends of said guide bar to mount said guide bar on the main surface of said main frame in cooperation with said guide bar clamp;

said main frame comprising a safe portion, opposed to said guide bar, for preventing contact of the supporting frame of said head carriage with the main surface of said main frame when said head carriage slides along said guide bar, said safe portion including a recessed cavity forming a continuous, uninterrupted surface with the main surface of the main frame thereby creating a frame without any openings therein around the area of the head carriage so as to prevent dirt and noise from passing into the disk driver via the main frame, the cavity being arranged to allow a portion of the supporting frame to project into the cavity for adequate clearance with the main surface and the supporting frame.

3. A magnetic disk driver as claimed in claim 3, wherein the concave portion is dented by half blanking.

* * * * *